US010005875B2

(12) United States Patent
Smits et al.

(10) Patent No.: US 10,005,875 B2
(45) Date of Patent: Jun. 26, 2018

(54) CO-POLYMER POLYOL

(71) Applicant: CRODA INTERNATIONAL PLC, Goole Yorkshire (GB)

(72) Inventors: Angela Leonarda Maria Smits, Zeist (NL); Remco Benjamin Van Triet, Reeuwijk (NL); Karin Van Der Helm-Rademaker, Gouda (NL); Wilhelmus Adrianus Jacobus Honcoop, Bergambacht (NL)

(73) Assignee: CRODA INTERNATIONAL PLC, Yorkshire (GB)

( * ) Notice: Subject to any disclaimer, the term of this patent is extended or adjusted under 35 U.S.C. 154(b) by 72 days.

(21) Appl. No.: 15/023,795

(22) PCT Filed: Sep. 10, 2014

(86) PCT No.: PCT/GB2014/052731
§ 371 (c)(1),
(2) Date: Mar. 22, 2016

(87) PCT Pub. No.: WO2015/044638
PCT Pub. Date: Apr. 2, 2015

(65) Prior Publication Data
US 2016/0229946 A1    Aug. 11, 2016

(30) Foreign Application Priority Data
Sep. 26, 2013 (GB) .................................. 1317113.7

(51) Int. Cl.
| | | |
|---|---|---|
| *C08G 63/60* | (2006.01) | |
| *C08G 18/42* | (2006.01) | |
| *C08G 18/36* | (2006.01) | |
| *C09D 175/06* | (2006.01) | |
| *C08G 18/76* | (2006.01) | |
| *C08G 63/553* | (2006.01) | |

(52) U.S. Cl.
CPC ......... *C08G 18/4286* (2013.01); *C08G 18/36* (2013.01); *C08G 18/4266* (2013.01); *C08G 18/4269* (2013.01); *C08G 18/4288* (2013.01); *C08G 18/7671* (2013.01); *C08G 63/553* (2013.01); *C08G 63/60* (2013.01); *C09D 175/06* (2013.01)

(58) Field of Classification Search
CPC ................................................ C08G 18/4288
See application file for complete search history.

(56) References Cited

U.S. PATENT DOCUMENTS

| | | | |
|---|---|---|---|
| 3,957,753 | A | 5/1976 | Hostettler |
| 4,430,131 | A | 2/1984 | Tremblay |
| 2008/0090973 | A1 | 4/2008 | Nefzger |

FOREIGN PATENT DOCUMENTS

| | | |
|---|---|---|
| GB | 1262383 | 2/1972 |
| GB | 1262384 | 2/1972 |
| GB | 1351207 | 4/1974 |
| GB | 1376353 | 12/1974 |
| JP | 51-097697 | 10/1983 |
| JP | 04-328186 | 11/1992 |
| JP | 06-329770 | 11/1994 |
| WO | 2002002667 | 1/2002 |
| WO | 2002092662 | 11/2002 |
| WO | 2004056901 | 7/2004 |
| WO | 2011022205 | 2/2011 |
| WO | 2013156450 | 10/2013 |
| WO | 2014029975 | 2/2014 |

OTHER PUBLICATIONS

International Search Report dated Jan. 15, 2015 for International Application No. PCT/GB2014/052731.
Joel Neale, "A Range of Partly Renewable Polyols for Performance Polyurethane Coatings and Adhesives", European Coatings Congress, Mar. 18, 2013.
Schaekens et al., Sustainable Building Blocks for Performance Adhesives (ECS), European Coatings Congress, Mar. 19, 2013.
Written Opinion dated Jan. 15, 2015 for International Application No. PCT/GB2014/052731.
T.E. Breuer, "Dimer Acids", J.I, Kroschwitz (ed.), Kirk-Othmer Encyclopedia of Chemical Technology, 4th Ed., 1193, vol. 8, pp. 223-237, Dec. 4, 2000.
International Preliminary Report of Patentability dated Mar. 29, 2016 issued in related International Application No. PCT/GB2014/052731.
Japanese Office Action from Japanese Patent Application No. 2016-516833 dated Apr. 17, 2018.

*Primary Examiner* — Michael F Pepitone
(74) *Attorney, Agent, or Firm* — RatnerPrestia

(57) ABSTRACT

The present invention provides a co-polymer polyol which has an ABA block structure wherein each A block comprises a plurality of hydroxy-carboxylic acid residues and the B block comprises at least one dimer fatty residue selected from a dimer fatty diacid residue, a dimer fatty diol residue and a dimer fatty diamine residue, wherein the co-polymer polyol comprises at least two hydroxyl end groups. The invention also provides a method of making the co-polymer polyol and a polyurethane comprising the co-polymer polyol.

17 Claims, No Drawings

CO-POLYMER POLYOL

CROSS REFERENCE TO RELATED APPLICATIONS

This application is the National Stage filing of International Appln. No. PCT/GB2014/052731, filed 10 Sep. 2014, and claims priority of GB Application No. 13171117, filed 26 Sep. 2013, the entirety of which applications is incorporated herein by reference for all purposes.

The present invention relates to a co-polymer polyol, a polyurethane comprising the co-polymer polyol, and a method of making the co-polymer polyol and the polyurethane.

The co-polymer polyol of the present invention may be used in making polyurethanes. Polyurethanes are extremely versatile materials and have been used in a wide variety of applications such as foam insulation, car seats, paint coatings, adhesives and abrasion resistant coatings.

Polyurethane paint coating compositions are surface protective and/or decorative coatings which may be applied to substrates and allowed to dry or cure to form continuous protective and decorative films. Such coatings may be applied to a wide variety of substrates including metals, wood, plastics, and plaster. Important properties of the formed film include hardness and resistance to water.

Polyurethane dispersion polymers are an important class of binders for aqueous coating compositions, as they produce excellent properties, such as chemical and stain resistance, hardness and toughness in the solid coating.

Polyurethanes are also used in a wide variety of forms, for example non-cellular materials such as elastomers, and cellular materials such as low density flexible foams, high density flexible foams, and microcellular foams.

Polyurethanes, both in dispersion and non-dispersion forms, are also known to find use in adhesives, for example in deployment in the furniture industry.

A polyurethane may be made by reacting an isocyanate with a polyol. The polyol may comprise a polyester or a polyamide.

The present invention seeks to provide an improved polyol which may be used in making polyurethanes so that one or more properties (e.g. physical properties) of the polyurethane is improved. Known polyols for use in polyurethanes may comprise multiple components. However, reactions may occur during the synthesis of the polyol which will tend to randomise or re-arrange the distribution or sequence of the components in the polyol. Such a reaction may be referred to as a randomisation reaction. An example of a randomisation reaction for a polyester polyol is transesterification. An example of a randomisation reaction for a polyamide polyol is transamidation. A randomisation reaction will result in a random co-polymer.

The present invention is based in part on the recognition by the applicant that by providing a co-polymer polyol which is an ABA block co-polymer (instead of a random co-polymer) in which the B block comprises at least one dimer fatty residue (for example, the residue of a dimer fatty diacid or derivative) and each A block comprises a plurality of hydroxy-carboxylic acid residues, the properties of a polyurethane made using the co-polymer polyol may be improved. Without being bound by theory, it is believed that this improvement may be due to the ABA sequence in the co-polymer polyol being maintained during synthesis of the co-polymer polyol. The B block may have a non-polar or hydrophobic nature due to the presence of the dimer residue and the A block may have a polar or hydrophilic nature due to the presence of the hydroxy-carboxylic acid residues. The ABA order of the block co-polymer may allow these non-polar and polar regions to phase separate in a polyurethane formed from the co-polymer polyol which may improve one or more physical properties of the polyurethane.

Thus viewed from a first aspect the present invention provides a co-polymer polyol which has an ABA block structure wherein each A block comprises a plurality of hydroxy-carboxylic acid residues and the B block comprises at least one dimer fatty residue selected from a dimer fatty diacid residue, a dimer fatty diol residue and/or a dimer fatty diamine residue, wherein the co-polymer polyol comprises at least two hydroxyl end groups.

Viewed from a second aspect the present invention provides a polyurethane comprising a co-polymer polyol of the first aspect.

Viewed from a third aspect, the present invention provides a method of making a co-polymer polyol of the first aspect comprising forming each A block on the B block by ring opening polymerisation of at least one lactone on to the B block.

Viewed from a fourth aspect, the present invention provides a method of making a polyurethane comprising reacting a co-polymer polyol of the first aspect with an isocyanate to form:
  (a) the polyurethane; or
  (b) an isocyanate-terminated pre-polymer which is then reacted with a chain extender to form the polyurethane.

Viewed from a fifth aspect, the present invention provides the use of a co-polymer polyol of the first aspect to form a polyurethane.

Viewed from a sixth aspect, the present invention provides an adhesive, coating, elastomer or foam comprising a co-polymer polyol of the first aspect or a polyurethane of the second aspect.

By providing a co-polymer polyol which is an ABA co-polymer in which the B block comprises at least one dimer fatty residue and each A block comprises a plurality of hydroxy-carboxylic acid residues, the properties of a polyurethane made using the co-polymer may be improved. The dimer fatty residue is selected from a dimer fatty diacid residue, a dimer fatty diol residue and a dimer fatty diamine residue. Without being bound by theory, it is believed that the hydrophobic and amorphous properties of the dimer fatty residue in the B block will contrast with the more hydrophilic and more crystalline properties of the plurality of hydroxy-carboxylic acid residues in each A block. This may allow the B blocks and A blocks to phase separate when the co-polymer polyol is used to make a polyurethane. The resulting polyurethane may have improved properties when compared with a polyurethane made with a polyol which does not include A blocks and B blocks. These improved properties may include one or more of Shore A hardness, tensile strength and elongation. The dimer fatty residue in the B block may provide flexibility to the polyurethane due to its amorphous nature. The plurality of hydroxy-carboxylic acid residues in each A block may provide hardness to the polyurethane due to their crystalline nature.

To avoid reactions that may randomise the arrangement of the A block component(s) and the B block component(s) during synthesis of the co-polymer polyol such as transesterification or transamidation, the plurality of hydroxy-carboxylic acid residues in the A block may be provided by using one or more lactones as a reactant. The use of one or more lactones may allow each A block to be formed on the B block by a reaction which will not randomise the arrangement of the A block component(s) and the B block component(s). An example of such a reaction may be a ring-opening polymerisation.

As used herein, the terms 'for example,' 'for instance,' 'such as,' or 'including' are meant to introduce examples that further clarify more general subject matter. Unless otherwise specified, these examples are provided only as an aid for understanding the applications illustrated in the present disclosure, and are not meant to be limiting in any fashion.

It will be understood that any upper or lower quantity or range limit used herein may be independently combined.

It will be understood that, when describing the number of carbon atoms in a substituent group (e.g. 'C1 to C6'), the number refers to the total number of carbon atoms present in the substituent group, including any present in any branched groups. Additionally, when describing the number of carbon atoms in, for example fatty acids, this refers to the total number of carbon atoms including the one at the carboxylic acid, and any present in any branch groups.

Many of the chemicals which may be used to produce the co-polymer polyol or polyurethane of the present invention are obtained from natural sources. Such chemicals typically include a mixture of chemical species due to their natural origin. Due to the presence of such mixtures, various parameters defined herein can be an average value and may be non-integral.

The term 'polyol' is well known in the art, and refers to a molecule comprising more than one hydroxyl group. The term 'active hydrogen' refers to the hydrogen atoms present as part of the hydroxyl groups of the polyol.

The term 'dimer fatty residue' as used herein, unless otherwise defined, refers to a residue of a dimer fatty acid (also referred to as a dimer fatty diacid) or a residue of a dimer fatty diacid derivative such as a dimer fatty diol or dimer fatty diamine.

The term 'dimer fatty acid' (also referred to as dimer fatty diacid) is well known in the art, and refers to the dimerisation products of mono- or polyunsaturated fatty acids and/or esters thereof. The related term trimer fatty acid similarly refers to trimerisation products of mono- or polyunsaturated fatty acids and/or esters thereof.

Dimer fatty acids are described in T. E. Breuer, 'Dimer Acids', in J. I. Kroschwitz (ed.), Kirk-Othmer Encyclopedia of Chemical Technology, 4th Ed., Wily, N.Y., 1993, Vol. 8, pp. 223-237. They are prepared by polymerising fatty acids under pressure, and then removing most of the unreacted fatty acid starting materials by distillation. The final product usually contains some small amounts of mono fatty acid and trimer fatty acids, but is mostly made up of dimer fatty acids. The resultant product can be prepared with various proportions of the different fatty acids as desired.

The ratio of dimer fatty acids to trimer fatty acids can be varied, by modifying the processing conditions and/or the unsaturated fatty acid feedstock. The dimer fatty acid may be isolated in substantially pure form from the product mixture, using purification techniques known in the art, or alternatively a mixture of dimer fatty acid and trimer fatty acid may be employed.

The dimer fatty acids or dimer fatty residues used in the present invention are preferably derived from the dimerisation products of C10 to C30 fatty acids, more preferably C12 to C24 fatty acids, particularly C14 to C22 fatty acids, further preferably C16 to C20 fatty acids, and especially C18 fatty acids. Thus, the resulting dimer fatty acids preferably comprise in the range from 20 to 60, more preferably 24 to 48, particularly 28 to 44, further preferably 32 to 40, and especially 36 carbon atoms.

The fatty acids, from which the dimer fatty acids are derived, may be selected from linear or branched unsaturated fatty acids. The unsaturated fatty acids may be selected from fatty acids having either a cis/trans configuration, and may have one or more than one unsaturated double bonds.

Preferably, the fatty acids used are linear monounsaturated fatty acids.

The dimer fatty acids may be hydrogenated. The dimer fatty acids may be non-hydrogenated. A hydrogenated dimer fatty residue (from a diacid, diol or diamine) may have better oxidative or thermal stability which may be desirable in a polyurethane formed from the co-polymer polyol.

Suitable dimer fatty acids are preferably derived from (i.e. are the dimer equivalents of) the dimerisation products of oleic acid, linoleic acid, linolenic acid, palmitoleic acid, or elaidic acid. In particular, suitable dimer fatty acids are derived from oleic acid.

The dimer fatty acids may be dimerisation products of unsaturated fatty acid mixtures obtained from the hydrolysis of natural fats and oils, e.g. sunflower oil, soybean oil, olive oil, rapeseed oil, cottonseed oil, or tall oil.

The molecular weight (weight average) of the dimer fatty acid is preferably in the range from 450 to 690, more preferably 500 to 640, particularly 530 to 610, and especially 550 to 590.

In addition to the dimer fatty acids, dimerisation usually results in varying amounts of trimer fatty acids (so-called "trimer"), oligomeric fatty acids, and residues of monomeric fatty acids (so-called "monomer"), or esters thereof, being present. The amount of monomer can, for example, be reduced by distillation.

Similarly, the optional trimer fatty acids are preferably derived from the trimerisation products of the materials mentioned with regard to the dimer fatty acids, and are preferably trimers of 010 to C30, more preferably C12 to C24, particularly C14 to C22, further preferably C16 to C20 fatty acids, and especially C18 fatty acids. Thus, the trimer fatty acids preferably contain in the range from 30 to 90, more preferably 36 to 72, particularly 42 to 66, further preferably 48 to 60, and especially 54 carbon atoms.

The molecular weight (weight average) of the trimer fatty triacids is preferably in the range from 750 to 950, more preferably 790 to 910, particularly 810 to 890, and especially 830 to 870.

In one embodiment of the present invention, tetramer fatty acids and higher oligomers (hereinafter both referred to as oligomeric acids) are formed during production of the dimer fatty acid. Such oligomeric acids may therefore also be present in the dimer fatty acids used in the present invention, in combination with trimer fatty acids and/or dimer fatty acids and/or mono fatty monoacids.

The oligomeric acids are preferably oligomers, containing 4 or more units derived from 010 to C30, more preferably C12 to C24, particularly C14 to C22, and especially C18 fatty acids. The molecular weight (weight average) of the oligomeric acid is suitably greater than 1,000, preferably in the range from 1,200 to 1,800, more preferably 1,300 to 1,700, particularly 1,400 to 1,600, and especially 1,400 to 1,550.

The dimer fatty acid used in the present invention preferably may have a dimer fatty acid (or dimer) content of greater than 60 wt. %, more preferably greater than 70 wt. %, particularly greater than 80 wt. %, and especially greater than 85 wt. %. Most preferably, the dimer content of the dimer fatty acid is in the range from 90 wt. % to 99 wt. %.

In an alternative embodiment, the dimer fatty acid preferably has a dimer fatty acid (or dimer) content in the range from 70 wt. % to 96 wt. %. This may be applicable in particular for two component or cross-linked systems.

In addition, particularly preferred dimer fatty acids may have a trimer fatty acid (or trimer) content of less than 40 wt. %, more preferably less than 30 wt. %, particularly less than 20 wt. %, and especially less than 15 wt. %. The trimer fatty acid content may be less than 1 wt. %.

Furthermore, the dimer fatty acid preferably comprises less than 10 wt. %, more preferably less than 6 wt. %, particularly less than 4 wt. %, and especially less than 3.5 wt. % of mono fatty monoacid (or monomer).

All of the above weight percentage values are based on the total weight of polymerised fatty acids and mono fatty acids present.

A dimer fatty diacid (or dimer fatty acid) may be converted to a dimer fatty diol as is known in the art. A dimer fatty diol may have properties as described herein with regard to a dimer fatty diacid (or dimer fatty acid) except that the acid groups in the dimer fatty diacid are replaced with hydroxyl groups in the dimer fatty diol. In a similar manner, a trimer fatty triacid may be converted to a trimer fatty triol which may have properties as described herein with regard to a trimer fatty triacid.

The dimer fatty diol may be hydrogenated. The dimer fatty diol may be non-hydrogenated.

A dimer fatty diacid (or dimer fatty acid) may be converted to a dimer fatty diamine as is known in the art. A dimer fatty diamine may have properties as described herein with regard to a dimer fatty diacid (or dimer fatty acid) except that the acid groups in the dimer fatty diacid are replaced with amine groups in the dimer fatty diamine. In a similar manner, a trimer fatty triacid may be converted to a trimer fatty triamine which may have properties as described herein with regard to a trimer fatty triacid.

The dimer fatty diamine may be hydrogenated. The dimer fatty diamine may be non-hydrogenated.

The B block of the co-polymer polyol comprises at least one dimer fatty residue selected from a dimer fatty diacid residue, a dimer fatty diol residue and/or a dimer fatty diamine residue.

The dimer fatty residue is fatty in nature and this may make the B block hydrophobic or substantially hydrophobic.

The presence of the dimer fatty residue may make the B block amorphous, non-crystalline or substantially non-crystalline.

Preferably the dimer fatty residue is selected from a dimer fatty diacid residue and/or a dimer fatty diol residue. The dimer fatty residue may be a dimer fatty diamine residue.

The B block may comprise a mixture of dimer fatty residue containing species. The average number of dimer fatty residues in the B block may be non-integral.

The B block may comprise on average at least 1.2, preferably 1.6 dimer fatty residues. The B block may comprise at least 2 dimer fatty residues. The dimer fatty residues may be the same or different. The B block may comprise at most 4, preferably at most 3, more preferably at most 2.5, even more preferably at most 2 dimer fatty residues.

The B block may have a molecular weight of at least 500, preferably at least 800, more preferably at least 1000, even more preferably at least 1500, especially preferably at least 1900. The molecular weight may be a weight average molecular weight. The molecular weight may be a number average molecular weight.

The B block may have a molecular weight of at most 5000, preferably at most 4000, more preferably at most 3000, even more preferably at most 2500, especially preferably at most 2100. The molecular weight may be a weight average molecular weight. The molecular weight may be a number average molecular weight.

The B block may comprise at least 20 wt % dimer fatty residue, preferably at least 40 wt %, more preferably at least 50 wt %. The B block may comprise at most 80 wt % dimer fatty residue, preferably at most 70 wt %.

The B block may comprise, consist essentially of, or consist of an oligoester, polyester or copolyester (referred to herein as a polyester). The polyester may have terminal hydroxyl groups which may provide the B block with terminal hydroxyl groups. The terminal hydroxyl groups may allow the B block to react with a lactone monomer to form the co-polymer polyol with at least two hydroxyl end groups.

The B block may further comprise one or more non-dimeric dicarboxylic acids. The non-dimeric dicarboxylic acids may be aliphatic or aromatic (such as phthalic acid, isophthalic acid and terephthalic acid), and include dicarboxylic acids and the esters, preferably alkyl esters, thereof, preferably linear dicarboxylic acids having terminal carboxyl groups having a carbon chain in the range from 2 to 20, more preferably 4 to 12 carbon atoms, such as adipic acid, glutaric acid, succinic acid, pimelic acid, suberic acid, azelaic acid, sebacic acid, heptane dicarboxylic acid, octane dicarboxylic acid, nonane dicarboxylic acid, decane dicarboxylic acid, undecane dicarboxylic acid, dodecane dicarboxylic acid and higher homologs thereof. Preferably the B block further comprises a non-dimeric dicarboxylic acid comprising from 6 to 12 carbon atoms. Adipic acid is particularly preferred.

The B block may comprise at least 10 wt % non-dimeric dicarboxylic acid, preferably at least 20 wt %. The B block may comprise at most 60 wt % non-dimeric dicarboxylic acid, preferably at most 50 wt %, more preferably at most 40 wt %.

The B block may further comprise one or more diols which are not dimer fatty diols (referred to herein as non-dimeric diols). Preferably the B block further comprises a non-dimeric diol. Suitable non-dimeric diols include straight chain aliphatic diols such as ethylene glycol, diethylene glycol, 1,3-propylene glycol, dipropylene glycol, 1,4-butylene glycol, 1,6-hexylene glycol and mixtures thereof, branched diols such as neopentyl glycol, 3-methyl pentane glycol, 1,2-propylene glycol and mixtures thereof, and cyclic diols such as 1,4-bis(hydroxymethyl)cyclohexane and (1,4-cyclohexane-dimethanol) and mixtures thereof. Preferably the B block further comprises a non-dimeric diol comprising from 2 to 10 carbon atoms. Hexanediol is particularly preferred.

The B block may be formed from diacid to diol starting materials at a molar ratio in the range from 1:1.0 to 5.0, more preferably 1:1.05 to 3.0, particularly 1:1.1 to 2.0, and especially 1:1.2 to 1.4. Thus, the diol is preferably present in molar excess so as to obtain a B block terminated at both ends with OH groups.

The B block may comprise at least 10 wt % non-dimeric diol, preferably at least 20 wt %, more preferably at least 30 wt %. The B block may comprise at most 70 wt % non-dimeric diol, preferably at most 60 wt %, more preferably at most 50 wt %.

The B block may comprise 20 to 40 wt % dimer fatty diacid and/or dimer fatty diol, 20 to 40 wt % non-dimeric dicarboxylic acid and 30 to 50 wt % non-dimeric diol.

The B block may comprise, consist essentially of, or consist of an oligoamide, polyamide or copolyamide (referred to herein as a polyamide). The polyamide may have terminal carboxylic acid groups which may be reacted with a diol (for example, a non-dimeric diol) to form a B block with terminal hydroxyl groups. Alternatively the polyamide may have terminal amine groups.

The B block may comprise, consist essentially of or consist of an oligoesteramide, polyesteramide or copolyesteramide (referred to herein as a polyesteramide). The polyesteramide may form a B block with terminal hydroxyl groups.

The B-block may further comprise one or more non-dimeric diamines. Suitable non-dimeric diamines include aliphatic, aromatic, cyclic and heterocyclic diamines and difunctional polyetheramines (for example, polyoxyalkylene-diamines).

The B block may comprise one or more aliphatic diamines. The amino groups may be at terminal ends of the carbon chain. The aliphatic diamines may have at least 4 carbon atoms, preferably at least 6 carbon atoms, more preferably at least 8 carbon atoms. The aliphatic diamines may contain up to 20 carbon atoms, preferably up to 16 carbon atoms, more preferably up to 12 carbon atoms. The aliphatic chain may be linear or branched. Preferred aliphatic diamines are selected from the group consisting of 1,4-butane diamine, 1,6-hexamethylene diamine, 1,8-diamino octane, 1,12-diamino dodecane and mixtures thereof.

The B block may further comprise one or more diamines selected from the group of cyclic diamines and heterocyclic diamines. Preferred cyclic (aliphatic) diamines or heterocyclic diamines are cyclohexanediamine, 4,4'-diamino-dicyclohexyl-methane, xylenediamine, piperazine, cyclohexanebis(methylamine), isophorone diamine, dimethylpiperazine and dipiperidylpropane.

The B block may further comprise one or more polyoxyalkylene-diamines, for example polyoxyethylene diamine, polyoxypropylenediamine or bis-(di-aminopropyl)-polytetrahydrofurane.

The B block may comprise at least 10 wt % non-dimeric diamine, preferably at least 20 wt %. The B block may comprise at most 60 wt % non-dimeric diamine, preferably at most 50 wt %, more preferably at most 40 wt %.

The B block may not comprise any residues which are present in an A block. Preferably the B block does not comprise a hydroxy-carboxylic acid residue. Preferably the B block does not comprise a lactone or a lactone derivative.

Each A block comprises a plurality of hydroxy-carboxylic acid residues. Each A block comprises at least two hydroxy-carboxylic acid residues, preferably at least 3, more preferably at least 4, even more preferably at least 6, yet more preferably at least 10.

The number of hydroxy-carboxylic acid residues may vary between A blocks and so the number of hydroxy-carboxylic acid residues in each A block may be given as an average and may be non-integral. Each A block may comprise an equal number of hydroxy-carboxylic acid residues. Preferably the A blocks are symmetrical in size and/or sequence about the B block.

Each A block may comprise at most 30 hydroxy-carboxylic acid residues, preferably at most 25, more preferably at most 20, even more preferably at most 15, yet more preferably at most 12, still more preferably at most 10.

The co-polymer polyol comprises at least 4 hydroxy-carboxylic acid residues in total, preferably at least 8, more preferably at least 12. The co-polymer polyol may comprise at most 60 hydroxy-carboxylic acid residues in total, preferably at most 40, more preferably at most 30, even more preferably at most 20.

The number of hydroxy-carboxylic acid residues in each A block may be selected to provide a desired molecular weight for the co-polymer polyol and/or a desired weight ratio of the weight of the B block to the total weight of the A blocks in the co-polymer polyol.

The hydroxy-carboxylic acid residues may be derived from a polar molecule, for example a hydroxy-carboxylic acid. Therefore the hydroxy-carboxylic acid residues may be polar in nature. This may make the A block hydrophilic or substantially hydrophilic.

The presence of the plurality of hydroxy-carboxylic acid residues may make the A block crystalline or substantially crystalline.

The plurality of hydroxy-carboxylic acid residues in each A block may be derived from at least one lactone.

A lactone is a cyclic ester which may be considered as the internal esterification product of a hydroxyl group and a carboxyl group in the same molecule of a hydroxy-carboxylic acid. For example, a hydroxy-caproic acid (with 6 carbon atoms) may form a capro-lactone.

An advantage of deriving the plurality of hydroxy-carboxylic acid residues in each A block from at least one lactone may be that the reaction mechanism by which the lactone is attached to the B block may result in the ABA co-polymer structure. For example, the reaction mechanism may be by ring-opening polymerisation of the lactone onto the B block, with the B block acting as an initiator. By comparison, if the equivalent hydroxy-carboxylic acid were used instead of the lactone (e.g. a hydroxy-caproic acid instead of a capro-lactone), this may result in some transesterification of the hydroxy-carboxylic acid within the B block which would product a random co-polymer instead of an ABA block co-polymer.

The at least one lactone may comprises at least 3 carbon atoms, preferably at least 4 carbon atoms, more preferably at least 5 carbon atoms.

The at least one lactone may comprises at most 9 carbon atoms, preferably at most 8 carbon atoms, more preferably at most 7 carbon atoms.

Preferably the plurality of hydroxy-carboxylic acid residues in each A block are derived from at least one lactone, wherein the at least one lactone comprises from 4 to 8 carbon atoms.

The lactone may be a lactone monomer.

The at least one lactone may be selected from a butyrolactone, a valerolactone, a caprolactone and mixtures thereof. A caprolactone is preferred.

The at least one lactone may be selected from a γ-lactone, a δ-lactone, a ε-lactone and mixtures thereof.

Preferably the at least one lactone comprises γ-butyrolactone, ε-caprolactone and mixtures thereof, more preferably ε-caprolactone.

A lactide is the cyclic diester of two molecules of a hydroxy-carboxylic acid in which the hydroxy and carboxylic group are on adjacent carbon atoms (e.g. a 2-hydroxy carboxylic acid). Such a hydroxy-carboxylic acid cannot form a lactone because the hydroxy and carboxylic group are too close to each other. Preferably each A block does not comprise a residue of a 2-hydroxy carboxylic acid. Preferably each A block is not derived from a lactide.

Preferably each A block does not comprise a dimer fatty residue. Each A block may not comprise a residue of a dimer fatty diacid or a derivative thereof. Each A block may not comprise a residue of a dimer fatty diacid, a dimer fatty diol or a dimer fatty diamine.

Preferably each A block consists essentially of, or consists of hydroxy-carboxylic acid residues.

The co-polymer polyol may be produced by pre-forming the B block segment, and forming the or each A block in situ in the presence of the B block.

The A blocks may be formed onto the B blocks by ring opening polymerisation. Preferably each A block is formed by ring-opening polymerisation of the at least one lactone on to the B block.

The hydroxy-carboxylic acid residue of each A block which is nearest to the B block may be joined to the B block by reaction of its carboxyl group with a hydroxyl or amine terminal (or end) group on the B block. This may orient the hydroxyl group of the hydroxy-carboxylic acid residue to be away from the B block. In this way the hydroxy-carboxylic acid residues of each A block may be oriented so that the co-polymer polyol of the invention has a hydroxyl terminal group at the end of each A block.

The ring opening polymerisation may be carried out at a temperature of less than 200° C., preferably less than 190° C., more preferably at most 180° C. A temperature below 200° C. may reduce the occurrence of transesterification. A temperature of at most 180° C. may prevent, or substantially prevent, transesterification occurring. The degree to which transesterification occurs may be temperature dependent. Significant transesterification may occur at temperatures above 180° C. during a standard esterification reaction or a ring opening polymerisation reaction.

The ring opening polymerisation reaction may be performed at a temperature of at least 120° C., preferably at least 140° C., more preferably at least 150° C. The ring opening polymerisation reaction may be performed at a temperature of up to 180° C., preferably at most 170° C. The ring opening polymerisation reaction may be performed at a temperature of about 160° C.

Preferably the co-polymer polyol is obtainable by forming each A block on the B block by a ring opening polymerisation reaction of at least one lactone on to the B block wherein the ring opening polymerisation reaction is performed at a temperature of up to 180° C. and wherein the temperature of the reaction is such that substantially no re-arrangement of the residues between the A block and the B block occurs.

A standard esterification reaction (not a ring opening polymerisation reaction) may take more than 48 hours to complete if it is performed at 180° C. or less and so it is generally performed at temperatures above 180° C.

The co-polymer polyol may be formed so that there is substantially no reordering or rearrangement of the residues between the B block and the A block. There may be no transesterification or substantially no transesterification in the co-polymer polyol.

The co-polymer polyol may be semi-crystalline or substantially semi-crystalline due to the A block being crystalline or substantially crystalline and the B block being non-crystalline or substantially non-crystalline.

Each A block may be harder than the B block. An A-block may be harder due to crystallisation of the oligomer being formed by the plurality of hydroxy-carboxylic acid residues resulting in a harder segment. An A block may be more crystalline that the B block at a reference temperature.

The B block may provide at least 30 wt %, preferably at least 40 wt %, more preferably at least 45 wt % of the co-polymer polyol. The B block may provide at most 70 wt %, preferably at most 60 wt %, more preferably at most 55 wt % of the co-polymer polyol. The B block may provide about 50 wt % of the co-polymer polyol.

The weight ratio in the co-polymer polyol of the weight of the B block to the total weight of the A blocks may be at least 0.75:1, preferably at least 0.8:1, more preferably at least 0.9:1. The weight ratio in the co-polymer polyol of the weight of the B block to the total weight of the A blocks may be at most 1.25:1, preferably at most 1.2:1, more preferably at most 1.1:1. The weight ratio of the B block to the total weight of the A blocks may be about 1:1.

A weight ratio in the co-polymer polyol of the weight of the B block to the total weight of the A blocks from at least 0.75:1 to at most 1.25:1 may improve the phase separation within a polyurethane formed from the co-polymer polyol. The phase separation may improve as the weight ratio of the B block to the total weight of the A blocks gets nearer to 1:1.

The co-polymer polyol may have a molecular weight of at least 800, preferably at least 1200, more preferably at least 1500. The co-polymer polyol may have a molecular weight of at most 5000, preferably at most 4000, more preferably at most 3000, more preferably at most 2500, even more preferably at most 2000. The molecular weight may be a weight average molecular weight. The molecular weight may be a number average molecular weight.

A polyurethane of the second aspect of the invention comprises a co-polymer polyol of the first aspect.

Preferably the A blocks and B blocks of the co-polymer polyol are phase separated in the formed polyurethane. The A blocks may be concentrated in a polar phase and the B blocks may be concentrated in a non-polar phase. The A blocks may be in a first phase and the B blocks may be in a second phase wherein the first phase is more polar than the second phase. The polyurethane may comprise a first phase which comprises the A blocks and a second phase which comprises the B blocks.

The plurality of hydroxy-carboxylic acid residues may make the A blocks more compatible than the B block with the isocyanate of the polyurethane. Therefore the first phase may be a continuous phase within the polyurethane comprising the A blocks and the isocyanate. The dimer fatty residue in the B blocks may make them less compatible with the isocyanate. The second phase comprising the B blocks may be a dispersed (or discrete) phase within the polyurethane The second phase may be dispersed in the first phase within the polyurethane.

If the polyurethane is an elastomer, the phase separation may occur on curing of the elastomer. If the polyurethane is in a polyurethane dispersion (PUD), the phase separation may occur during evaporation of water from the dispersion.

The polyurethane may further comprise an isocyanate or polyisocyanate.

The isocyanate component of the polyurethane may be at least one isocyanate which has a functionality of at least 2, and may be an aliphatic isocyanate such as hexamethylene 1,6-diisocyanate, but more preferably is an aromatic isocyanate such as tolylene diisocyanate, m-phenylene diisocyanate, p-phenylene diisocyanate, xylylene diisocyanate, 4,4'-diphenylmethane diisocyanate, hexamethylene diisocyanate, isophorone diisocyanate, polymethylenepolyphenyl diisocyanate, 3,3'-dimethyl-4,4'-biphenylene diisocyanate, 3,3'-dimethyl-4,4'-diphenylmethane diisocyanate, 3,3-dichloro-4,4'-biphenylene diisocyanate, 1,5-naphthalene diisocyanate, or modified compounds thereof such as uretonimine-modified compounds thereof. The polyisocyanate monomers can be used alone or as mixtures thereof. In a preferred embodiment, 4,4'-diphenylmethane diisocyanate (MDI) is used alone, or more preferably a mixture of MDI and a uretonimine-modified 4,4'-diphenylmethane diisocyanate (modified MDI) is employed.

The polyurethane of the invention may be made by reacting a co-polymer polyol of the invention with an isocyanate to form:
(a) the polyurethane; or
(b) an isocyanate-terminated pre-polymer which is then reacted with a chain extender to form the polyurethane.

The isocyanate may be a polyisocyanate. The isocyanate may be a diisocyanate.

In one embodiment of the invention, at least one of the isocyanates mentioned herein is reacted with the co-polymer polyol of the invention, to form a pre-polymer. The pre-polymer may be an isocyanate terminated pre-polymer. The ratio of isocyanate to co-polymer polyol starting materials which are mixed together to react to form the prepolymer is preferably in the range from 20 to 80:20 to 80%, more preferably 35 to 75:25 to 65%, particularly 45 to 70:30 to 55%, and especially 55 to 65:35 to 45% by weight. The isocyanate is preferably used in molar excess relative to OH group content of the co-polymer polyol, so as to obtain a reaction mixture containing isocyanate-terminated prepolymer and sufficient unreacted isocyanate, such that later addition of the chain extender can result in reaction to form the polyurethane, without the requirement for adding further isocyanate.

The pre-polymer reaction mixture preferably has an isocyanate content (measured as described herein) in the range from 5 to 30%, more preferably 15 to 23%, particularly preferably 17 to 20% NCO.

The polyurethane may further comprise a chain extender.

The chain extender component may be used to form a polyurethane by reaction with a prepolymer formed from the co-polymer polyol and isocyanate as mentioned herein. The chain extender may comprise a low molecular weight compound having 2 or more active hydrogen groups, for example polyols such as ethylene glycol, diethylene glycol, propylene glycol, 1,4-butylene glycol, 1,5-pentylene glycol, methylpentanediol, 1,6-hexylene glycol, neopentyl glycol, trimethylolpropane, hydroquinone ether alkoxylate, resorcinol ether alkoxylate, glycerol, pentaerythritol, diglycerol, and dextrose; aliphatic polyhydric amines such as ethylenediamine, hexamethylenediamine, and isophorone diamine; aromatic polyhydric amines such as methylene-bis(2-chloroaniline), methylenebis(dipropylaniline), diethyl-toluenediamine, trimethylene glycol di-p-aminobenzoate; alkanolamines such as diethanolamine, triethanolamine and diisopropanolamine.

In a preferred embodiment of the invention, the chain extender is a polyol, more preferably a diol, particularly having an aliphatic linear carbon chain comprising in the range from 1 to 10, and especially 3 to 5 carbon atoms. Preferred diols include ethylene glycol, propylene glycol, 1,4-butylene glycol, and 1,5-pentylene glycol. 1,4-butylene glycol is particularly preferred.

In the present invention, the chain extender composition may optionally contain other additives such as blowing agents, urethane promoting catalysts, surfactants, stabilizers and pigments.

Suitable blowing agents include water, and fluorocarbons such as trichlorofluoromethane, dichlorodifluoromethane and trichlorodifluoroethane. The blowing agents may be used alone or as mixtures thereof.

Examples of urethane catalysts include tertiary amines such as triethylamine, 1,4-diazabicyclo[2.2.2.]octane (DABCO), N-methylmorpholine, N-ethylmorpholine, N,N,N',N'-tetramethylhexamethylenediamine, 1,2-dimethylimidazol; and tin compounds such as tin(II)acetate, tin(II) octanoate, tin(II)laurate, dibutyltin dilaurate, dibutyltin dimaleate, dioctyltin diacetate and dibutyltin dichloride. The catalysts may be used alone or as mixtures thereof.

Suitable surfactants include silicone surfactants such as dimethylpolysiloxane, polyoxyalkylene polyol-modified dimethylpolysiloxane and alkylene glycol-modified dimethylpolysiloxane; and anionic surfactants such as fatty acid salts, sulfuric acid ester salts, phosphoric acid ester salts and sulfonates.

Examples of the stabilizers include hindered phenol radical scavengers such as dibutylhydroxytoluene, pentaerythrityl-tetrakis[3-(3,5-di-t-butyl-4-hydroxyphenyl)propionate] and isooctyl-3-(3,5-di-t-butyl-4-hydroxyphenyl)propionate; antioxidants such as phosphorous acid compounds such as triphenylphosphite, triethylphosphite and triphenylphosphine; ultraviolet absorbing agents such as 2-(5-methyl-2-hydroxyphenyl)benzotriazole and a condensation product of methyl-3-[3-t-butyl-5-(2H-benzotriazole-2-yl)-4-hydroxyphenyl]propionate and polyethylene glycol. Suitable pigments include inorganic pigments such as transition metal salts; organic pigments such as azo compounds; and carbon powder.

The polyurethane may be used in many applications. The polyurethane of the present invention may be used in coating compositions, adhesive compositions, elastomers or foams. In particular, the polyurethane may find application in elastomers.

The polyurethanes may be formed into a dispersion, in particular if they are to be used in coating compositions or adhesive compositions. Said dispersions may comprise in the range from 10 wt. % to 80 wt. % polyurethane. Preferably, from 20 wt. % to 60 wt. % polyurethane. More preferably, from 30 wt. % to 50 wt. % polyurethane.

The polyurethane dispersion may be in the form of a coating. The polyurethane dispersion in the form of a coating may have a water absorption of less than 6%, preferably less than 5% after immersion in water for 24 hours based on the weight of the polyurethane dispersion.

A polyurethane dispersion according to the present invention may have a Konig hardness of at least 24 s, preferably at least 26 s, more preferably at least 30 s.

Protective or decorative coatings prepared from a composition according to the present invention can be formulated with a wide variety of ingredients well known to those skilled in the art of coating formulation, including solvents, fillers, pigments, pigment dispersing agents, rheology modifiers, thixotropes, flow and levelling aids, defoamers, etc.

Coating compositions of the present invention can be applied by any number of techniques including spray, brush, roller, paint mitt, and the like. Numerous substrates are suitable for application of coatings of this invention with proper surface preparation, as is well understood in the art. Such substrates include, but are not limited to, many types of metal, particularly steel and aluminium, as well as concrete.

The coating compositions may be suitable for use as a primer coating on substrates such as concrete and steel. A preferred coating or overcoat layer to be used on top of a primer coating layer. Coatings of this invention can be applied and cured at ambient temperatures ranging from about 0° C. to about 50° C.

The polyurethane may also be used in adhesive compositions. The adhesive may preferably be applicable to a suitable substrate, preferably wood, in situ as a free flowing viscous solid, and cured, by reacting with water present in the substrate, at ambient temperature. Adhesives based on polyurethane of the present invention are for example, used for the lamination of furniture front panels and automotive interior trim parts, and for the bonding of shoe soles. In these applications, strong and reliable initial bond strength is essential as the finished parts are often processed further immediately after the bonding process and short cycle times are fundamental.

The adhesive may also comprise other optional components such as fillers, for example nylon, glass fibre, fumed silica, wood flour; and other agents such as pigments, antioxidants, stabilizers, flow additives etc.

The polyurethane of the present invention may also be used in elastomer compositions. These polyurethane elastomers may be solid elastomers or microcellular elastomers.

The modulus will be understood to represent the force (stress) required to produce a certain elongation (strain) in this case 100%, i.e. a measure of tensile strength at a 100% elongation. Compounds with a higher modulus will be understood to be more resilient and more resistant to extrusion.

The polyurethane elastomer may have a (maximum) elongation according to ISO 527-2 of at least 400%, preferably at least 450%, more preferably at least 500%, even more preferably at least 550%.

The polyurethane elastomer may have a 100% modulus value of greater than 40 kg/cm$^2$. Preferably, the polyurethane elastomer has a 100% modulus value greater than 45 kg/cm$^2$.

The polyurethane elastomer may have a 300% modulus value of greater than 70 kg/cm$^2$. Preferably, the polyurethane elastomer has a 300% modulus value greater than 80 kg/cm$^2$.

The polyurethane elastomer may also exhibit good hardness properties. The hardness of the elastomer may be defined as the material's resistance to permanent indentation. The elastomer composition may have a Shore A hardness of at least 60 Shore A, preferably at least 70, more preferably at least 80. The Shore A hardness may be measured according to ISO 868 norm.

The polyurethane elastomer may have a tensile strength at break measured according to ISO 527-2 norm of at least 50N, preferably at least 100N, more preferably at least 150N, even more preferably at least 200N. The tensile strength measured according to ISO 527-2 norm is a standard measurement which measures a standard elastomer sample. The tensile strength may be at least 300N or may be at least 400N.

The tensile strength of a polyurethane elastomer made with an ABA co-polymer polyol of the present invention may be higher than an elastomer made with a polyol made from the same ingredients which are randomly distributed instead of in ABA sequence. This is shown in examples E1 and E2 below. The tensile strength of a polyurethane elastomer made with an ABA co-polymer polyol of the present invention may be at least 100% higher, preferably at least 200% higher, more preferably at least 300% higher than an elastomer made with a polyol made from the same ingredients which are randomly distributed.

All of the features described herein may be combined with any of the above aspects of the invention, in any combination.

EXAMPLES

The present invention will now be described further by way of example only with reference to the following Examples. All parts and percentages are given by weight unless otherwise stated.

It will be understood that all tests and physical properties listed have been determined at atmospheric pressure and room temperature (i.e. about 20° C.), unless otherwise stated herein, or unless otherwise stated in the referenced test methods and procedures.

Tests of polyurethane dispersions in coatings were performed at 23° C. with a relative humidity of 50%.

Test Methods:

Molecular weight number average was determined by end group analysis with reference to the hydroxyl value.

The hydroxyl value is defined as the number of mg of potassium hydroxide equivalent to the hydroxyl content of 1 g of sample, and was measured by acetylation followed by hydrolysation of excess acetic anhydride. The acetic acid formed was subsequently titrated with an ethanolic potassium hydroxide solution.

The acid value is defined as the number of mg of potassium hydroxide required to neutralise the free fatty acids in 1 g of sample, and was measured by direct titration with a standard potassium hydroxide solution.

The isocyanate value or content is defined as the weight % content of isocyanate in the sample and was determined by reacting with excess dibutylamine, and back titrating with hydrochloric acid.

Hardness was measured using a Shore A meter on a 10 mm thick sample according to ISO 868 norm. Mean value of 10 readings calculated.

Elongation was measured using an Instron tensile tester according to ISO 527-2 norm Tensile Strength was measured using an Instron tensile tester according to ISO 527-2 norm.

Modulus was calculated as the tensile strength required to achieve a predetermined elongation (for example 100% or 300% elongation).

Compounds used in to make Polyols 1 to 3 in examples P1 to P3 below are identified as follows:

PRIPOL 1006™—hydrogenated dimer fatty diacid (C36) ex Croda

Adipic acid (C6 dicarboxylic acid)

1,6 hexanediol

Mono ethylene glycol

CAPA—caprolactone monomer ex Perstorp

Polyols 1 to 3 were made at a molecular weight of about 2000 derived from a hydroxyl (OH) value of 56 mg KOH/g.

Polyols 1 and 2 were made from the same ingredients but Polyol 1 was synthesised to be a random polyol and Polyol 2 was synthesised to be an ABA block polyol. Comparison of the test data for the polyurethane dispersions (PUD 1 and 2) and the polyurethane elastomers (E1 and E2) made from Polyol 1 and Polyol 2 shows the improvement in properties of a polyurethane formed from Polyol 2 compared with Polyol 1.

Example P1: Formation of Polyol 1 (a Random Type Polyester Polyol)—Comparative Example 50 parts by weight Pripol 1006, 50 parts Adipic acid, 68.5 parts hexanediol, and 188 parts of caprolactone (CAPA-monomer ex Perstorp) were charged to a reactor equipped with a stirrer, a thermometer, a gas inlet and a condenser. The temperature in the reactor was raised to 220-230° C. under normal pressure in a nitrogen atmosphere. Under these conditions an esterification reaction was conducted until the desired acid and hydroxyl value were obtained. Analysis of the obtained polyester polyol gave an acid value <1 mg KOH/g and a hydroxyl value of 56 mg KOH/g.

The final reaction product obtained was a polyester polyol of random type (Polyol 1).

Example P2: Formation of Polyol 2 (an ABA Co-Polymer Polyol)

50 parts by weight of Pripol 1006, 50 parts Adipic acid, 68.5 parts hexanediol, were charged to a reactor equipped with a stirrer, a thermometer, a gas inlet and a condenser. The temperature in the reactor was raised to 220-230° C. under normal pressure in a nitrogen atmosphere. Under these conditions the esterification reaction was conducted until the desired acid/hydroxyl value were obtained. Analysis of the obtained polyester polyol (Polyol 2B) gave an acid value <1 mg KOH/g and hydroxyl value 110 mg KOH/g. Polyol 2B was used as the B block in the next part of the method.

The temperature in the reactor was lowered to 160° C. and 188 parts of caprolactone (CAPA-monomer ex Perstorp) with 0.05 parts of tin octoate as polymerisation catalyst were added. A ring opening polymerisation reaction was conducted until the desired acid/hydroxyl value were obtained. The resulting polyester polyol (Polyol 2) gave an acid value <1 mg KOH/g and a hydroxyl value of 56 mg KOH/g.

The final reaction product obtained was a polyester polyol of the ABA type (Polyol 2).

Example P3: Formation of Polyol 3 (an ABA Co-Polymer Polyol)

100 g of Pripol 1006 and 17.8 g of mono-(ethylene glycol) were charged to a reactor equipped with a stirrer, a thermometer, a gas inlet and a condenser. The temperature in the reactor was raised to 220-230° C. under normal pressure in a nitrogen atmosphere. Under these conditions the esterification reaction was conducted until the desired acid/hydroxyl value were obtained. Analysis of the obtained polyester polyol (Polyol 3B) gave an acid value <1 mg KOH/g and hydroxyl value 110 mg KOH/g. Polyol 3B was used as the B block in the next part of the method.

150 parts by weight of Polyol 3B, 185 parts of caprolactone (CAPA-monomer ex Perstorp) and 0.05 parts of tin octoate as polymerisation catalyst were charged to a reactor equipped with a stirrer, a thermometer, a gas inlet and a condenser. The temperature in the reactor was raised to 160° C. under normal pressure in a nitrogen atmosphere. Under these conditions the ring openings polymerisation reaction was conducted until the desired acid/hydroxyl value were obtained. The resulting polyester polyol (Polyol 3) gave an acid value <1 mg KOH/g and a hydroxyl value of 56 mg KOH/g.

The final reaction product obtained was a polyester polyol of the ABA-type (Polyol 3).

Examples PUD1 to PUD3: Polyurethane Dispersions Formed from Polyols 1 to 3

Polyurethane dispersions (PUD) were made from Polyol 1 of Example P1 (PUD1), Polyol 2 of Example P2 (PUD2) and Polyol 3 of Example P3 (PUD3). PUD synthesis was performed using a pre-polymer process as described below.
Ingredients:
  60.75 g of Polyol 1, 2 or 3
  5.1 g dimethylolproprionic acid (DMPA)
  22.9 g isophorone diisocyanate (IPDI)
  11.2 g N-methyl pyrrolidone (NMP)
  150 g water
  0.9 g ethylenediamine (EDA)

Polyol 1, Polyol 2 or Polyol 3, DMPA and NMP (solvent) are dried at 120° C. under nitrogen. After cooling to 70° C., dibutyl tin dilaurate (DBTL) catalyst (0.05% wt on pre-polymer) and slowly IPDI (aliphatic diisocyanate) are added to produce the pre-polymer, during approximately 3 hours. Then at 60° C. triethylamine (TEA) is added for neutralising the DMPA carboxylic acid groups, during 0.5 to 1 hour, followed by cooling to between 40 to 55° C. Then the prepolymer is dispersed in demineralised water, adding slowly during 1 hour under vigorous stirring. At 25° C. the prepolymer is chain extended with EDA, added drop-wise and reacted 2 hours. Result is a 40% solids PUD. Acetone can be used as processing aid, to reduce viscosity, and distilled off from the final PUD.

Evaluation Methods for Polyurethane Dispersions:
  Particle size: Zetasizer using dynamic light scattering
  Konig hardness: tested using DIN ISO 2815
  Chemical resistance: Spot test, rating 0=undamaged to 5=complete damage
  Water absorption: determined by measuring weight increase after 24 h in demineralised water at room temperature The polyurethane dispersions PUD1 to 3 were evaluated in the form of a coating and the physical properties measured are given in Table 1.

TABLE 1

Physical Properties of PUD 1 to 3

|  | PUD1 | PUD2 | PUD3 |
|---|---|---|---|
| Particle size (nm) | 62 | 104 | 129 |
| Konig hardness (s) | 22 | 30 | 32 |
| Chemical resistance to: | | | |
| Ammonia 10% (2 min.) | 4 | 2 | 2 |
| Water (16 hours) | 4 | 0 | 0 |
| Ethyl acetate (10 sec) | 4 | 2 | 2 |
| Water absorption (%) | 6 | 4 | 4.5 |

It can be seen from the results in Table 1 that the polyurethane dispersions made from the ABA co-polymer polyols (PUD2 and PUD3) have larger particle size and higher hardness than the random co-polymer polyol (PUD1). Furthermore the resistance to all tested chemicals is higher for PUD2 and PUD3 resulting in lower damage ratings (0=undamaged and 5=complete damage). Finally PUD2 and PUD3 have lower water absorption than PUD1.

Examples E1 to E3: Polyurethane Elastomers Formed from Polyols 1 to 3

Polyurethane elastomers were made from Polyol 1 of Example P1 (E1), Polyol 2 of Example P2 (E2) and Polyol 3 of Example P3 (E3).

The polyurethane elastomers were prepared using 1 part by weight of Polyol 1, 2 or 3, 2 parts 1,4-butanediol (BDO) as a chain extender, and 3.1 parts 4,4'-diphenylmethane diisocyanate (MDI), using a one-shot method. To form the elastomer Polyol 1, 2 or 3 and 1,4-butanediol (BDO) chain extender were blended and pre-heated at 50° C. and degassed in a degassing chamber. The Polyol and BDO were mixed thoroughly, after which molten 4,4'-diphenylmethane diisocyanate (MDI) was added. The reaction mixture was stirred efficiently, transferred to the degassing chamber for a few minutes until significant viscosity increase occurred. The mixture was then poured into a preheated 100° C. steel mould. The mould was closed and transferred to an oven at 100° C. After 2 hours the elastomer was de-moulded and further cured at 100° C. for another 18 hours.

The physical properties of each elastomer E1 to E3 were determined and are shown in Table 2.

TABLE 2

Physical properties of E1 to E3

|  | E1 | E2 | E3 |
|---|---|---|---|
| Hardness (Shore A) | 75 | 85 | 78 |
| Tensile strength at break (N) | 57 | 461 | 215 |
| Elongation (%) | 370 | 586 | 575 |
| 100% modulus (Kg/cm2) | 35 | 47 | 54 |
| 300% modulus (Kg/cm2) | 56 | 96 | 89 |

As can be seen from Table 2 the use of Polyols 2 and 3 (with an ABA structure) to form a polyurethane elastomer improves the hardness, tensile strength, maximum elongation and modulus of the elastomers (E2 and E3) compared to the use of Polyol 1 (with a random structure).

It is to be understood that the invention is not to be limited to the details of the above embodiments, which are described by way of example only. Many variations are possible.

The invention claimed is:

1. A co-polymer polyol which has an ABA block structure wherein:
    each A block comprises a plurality of hydroxy-carboxylic acid residues; and
    the B block comprises:
        at least one dimer fatty residue selected from a dimer fatty diacid residue, a dimer fatty diol residue and a dimer fatty diamine residue; and
        one or more non-dimeric dicarboxylic acids;
    wherein the co-polymer polyol comprises at least two hydroxyl end groups.

2. The co-polymer polyol as claimed in claim 1 wherein the hydroxy-carboxylic acid residues in each A block are derived from at least one lactone, wherein the at least one lactone comprises from 4 to 8 carbon atoms.

3. The co-polymer polyol as claimed in claim 1 wherein each A block does not comprise a dimer fatty residue.

4. The co-polymer polyol as claimed in claim 1 wherein each A block consists of hydroxy-carboxylic acid residues.

5. The co-polymer polyol as claimed in claim 2 wherein each A block is formed by ring-opening polymerisation of the at least one lactone on to the B block.

6. The co-polymer polyol as claimed in claim 1 wherein the B block further comprises a non-dimeric diol.

7. The co-polymer polyol as claimed in claim 1 wherein the B block comprises a non-dimeric dicarboxylic acid comprising from 6 to 12 carbon atoms.

8. The co-polymer polyol as claimed in claim 1 wherein the B block does not comprise a hydroxy-carboxylic acid residue.

9. The co-polymer polyol as claimed in claim 1 wherein the weight ratio of the weight of the B block to the total weight of the A blocks is from at least 0.75:1 to at most 1.25:1.

10. The co-polymer polyol as claimed in claim 1 which is obtained by forming each A block on the B block by a ring opening polymerisation reaction of at least one lactone on to the B block wherein the ring opening polymerisation reaction is performed at a temperature of up to 180° C. and wherein the temperature of the reaction is such that substantially no re-arrangement of the residues between the A block and the B block occurs.

11. A polyurethane comprising a co-polymer polyol as claimed in claim 1.

12. The polyurethane as claimed in claim 11 wherein the A blocks and B block of the co-polymer polyol are phase separated in the formed polyurethane.

13. The polyurethane as claimed in claim 11 wherein the polyurethane is a polyurethane elastomer with a tensile strength at break of at least 200 N when measured according to ISO 527-2.

14. A method of making a co-polymer polyol as claimed in claim 1 comprising forming each A block on the B block by ring opening polymerisation of at least one lactone on to the B block.

15. The method as claimed in claim 14 wherein the ring opening polymerisation is carried out at a temperature of up to 180° C.

16. A method of making a polyurethane comprising reacting a co-polymer polyol as claimed in claim 1 with an isocyanate to form:
    (a) the polyurethane; or
    (b) an isocyanate-terminated pre-polymer which is then reacted with a chain extender to form the polyurethane.

17. An adhesive, coating, elastomer or foam comprising a co-polymer polyol as claimed in claim 1.

* * * * *